United States Patent [19]

Tuday

[11] Patent Number: 5,630,339
[45] Date of Patent: May 20, 1997

[54] PARK MECHANISM FOR VEHICLE TRANSMISSION

[75] Inventor: Thomas Tuday, Tecumseh, Mich.

[73] Assignee: General Motors Corporation, Detroit, Mich.

[21] Appl. No.: 556,880

[22] Filed: Nov. 2, 1995

[51] Int. Cl.⁶ .................................................. G05G 1/00
[52] U.S. Cl. ...................... 74/577 R; 74/575; 74/577 M; 192/4 A; 192/4 C
[58] Field of Search .............................. 74/473 R, 575, 74/577 S, 512, 577 M; 192/4 A; 188/31

[56] References Cited

U.S. PATENT DOCUMENTS

| 3,601,230 | 8/1971 | Platz | 192/4 A |
|---|---|---|---|
| 3,703,941 | 11/1972 | Ohie et al. | 188/31 |
| 3,815,713 | 6/1974 | Dietrich | 192/13 A |
| 4,369,867 | 1/1983 | Lemieux | 192/4 A |
| 4,421,214 | 12/1983 | Sellmeyer | 192/4 A |
| 4,518,066 | 5/1985 | Barr | 192/4 C |
| 4,576,261 | 3/1986 | Barr | 192/4 A |
| 4,671,133 | 6/1987 | Yamada | 74/530 |
| 5,131,288 | 7/1992 | Barlas | 74/512 |
| 5,170,869 | 12/1992 | Svab et al. | 192/4 A |
| 5,269,195 | 12/1993 | Kitagawara | 74/411.5 |
| 5,295,412 | 3/1994 | Donato et al. | 74/577 R |

Primary Examiner—Vinh T. Luong
Attorney, Agent, or Firm—Charles E. Leahy

[57] ABSTRACT

A park pawl in a transmission is rotatably supported on a manually rotatable control rod and resiliently biased toward engagement with a toothed output gear by a spring acting between the control rod and the pawl. A lost-motion driving connection provided between the control rod and the pawl function to permit movement of the pawl toward and away from engagement with the toothed output gear under influence of the spring and independent of the control rod position when the control rod is rotated to a Park position. However, when the control rod is rotated to a non-Park position, the driving connection is established to forcibly move the pawl out of engagement with the toothed output gear.

3 Claims, 2 Drawing Sheets

PARK MECHANISM FOR VEHICLE TRANSMISSION

The invention relates to a Park locking mechanism for a vehicle transmission and, more particularly, provides a spring biased lock pawl which is forcibly moved to a disengaged position by a rotatable control rod.

BACKGROUND OF THE INVENTION

It is well known in motor vehicle transmissions to provide a toothed output gear which can be selectively engaged by a pawl to lock the output gear to the transmission case. This Park operating mode of the transmission is obtained by the vehicle operator manually shifting a lever to activate the pawl.

It is an object of the present invention to provide an improved Park mechanism for a transmission.

SUMMARY OF THE INVENTION

According to the invention, a Park pawl is rotatably supported on a manually rotatable control rod and resiliently biased toward engagement with a toothed output gear by a spring acting between the control rod and the pawl. A lost-motion driving connection provided between the control rod and the pawl function to permit movement of the pawl toward and away from engagement with the toothed output gear under influence of the spring and independent of the control rod position when the control rod is rotated to a Park position. However, when the control rod is rotated to a non-Park position, the driving connection is established to forcibly move the pawl out of engagement with the toothed output gear.

These and other objects and advantages will become more apparent with reference to the following drawings and the Description of the Preferred Embodiment.

DESCRIPTION OF THE PREFERRED EMBODIMENT

Figures 1, 2:
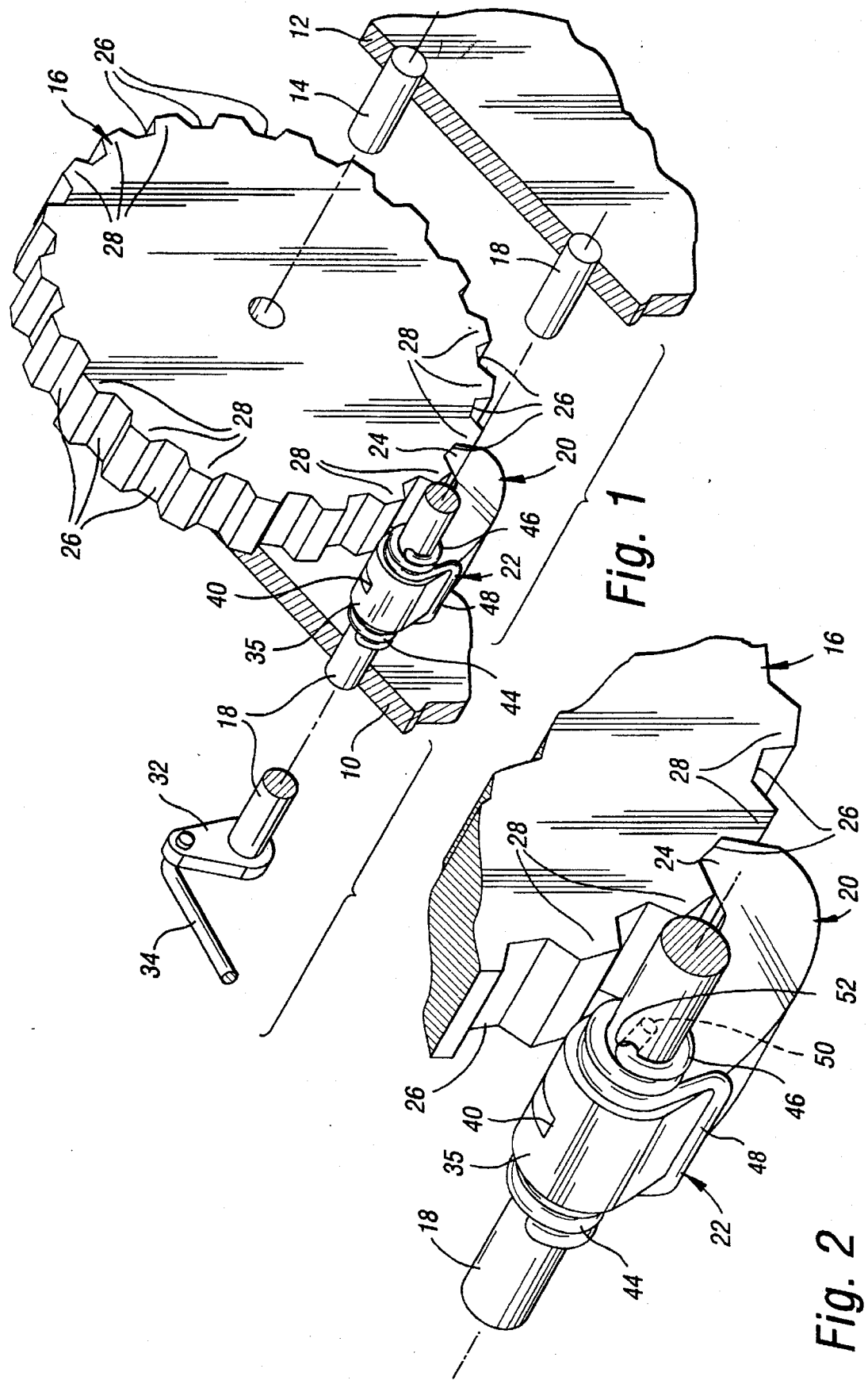
FIG. 1 is a perspective view of a Park mechanism for a vehicle transmission.
FIG. 2 is an enlarged fragmentary view of FIG. 1.

Referring to FIG. 1, it is seen that a transmission case includes housing walls 10 and 12 upon which an output shaft 14 is rotatably journalled. A toothed output gear 16 is suitably attached to the output shaft 14 for rotation therewith.

A control rod 18 is also journalled on the housing walls 10 and 12 and carries a pawl 20 and torsion spring 22. The pawl 20 has a pawl tooth 24 which is selectively engageable with mating recesses 26 defined between teeth 28 of the output gear 16. The control rod 18 is rotatably movable by a bell crank 32 and actuating rod 34.

Figure 3:
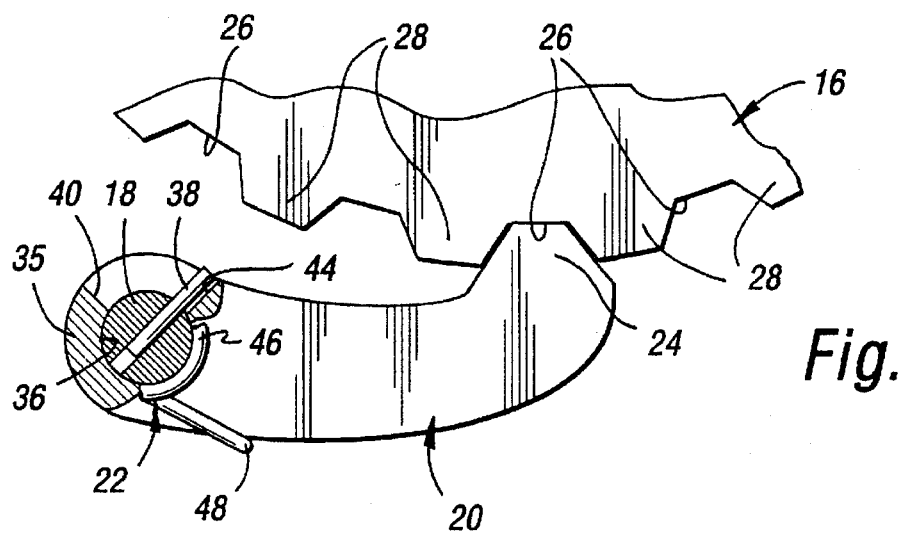
FIG. 3 is a fragmentary end view of the mechanism showing the control rod and the pawl, both in their respective Park positions.

As best seen in FIGS. 2 and 3, the pawl 20 has a hub 35 with a bore 36 therethrough for rotatably receiving the control rod 18. A drive pin or member 38 is anchored in the control rod 18 and projects radially into a arcuate slot 40 provided in the hub 35 of the pawl 20.

As best seen in FIG. 2, the torsion spring assembly 22 acts between the control rod 18 and the pawl 20. The torsion spring assembly 22 includes first and second coils 44 and 46 which encircle the control rod 18 on either side of the pawl hub 35. The coils are connected by an arm portion 48 which bears upon the pawl 20. The coil 46 has a free leg 50 which is anchored within a hole 52 provided in the control rod 18. The spring coil 44 includes a similar leg, not shown, which is likewise anchored in a hole of the control rod 18.

As seen in FIG. 3, spring coils 44 and 46 bias the spring arm 48 in the counterclockwise direction so that the pawl 20 is constantly urged relative the control rod 18 in the direction engaging pawl 24 with one of the toothed recesses 26 of toothed output gear 16. Because the drive pin 38 rides in pawl slot 40, there is no driving connection between the control rod 18 and pawl 20 and the force to engage the pawl 20 with the toothed output gear 16 is provided solely by the torsion spring assembly 22.

As seen in FIG. 3, the pawl hub 35 has an abutment wall 44 which defines the end of the slot 40. Upon clockwise rotation of the control rod 18, as viewed in FIG. 4, the spring assembly 22 is compressed until the pin 38 carried by the control rod 18 is brought into engagement with the abutment wall 44 of the pawl slot 40 so that the clockwise rotation of the control rod 18 is effective to drive the pawl 20 to the non-Park position of FIG. 4. Thus, FIG. 4 is seen as showing both the control rod 18 and the pawl 20 in their non-Park positions in which the toothed output gear 16 is free to rotate.

Figure 4:
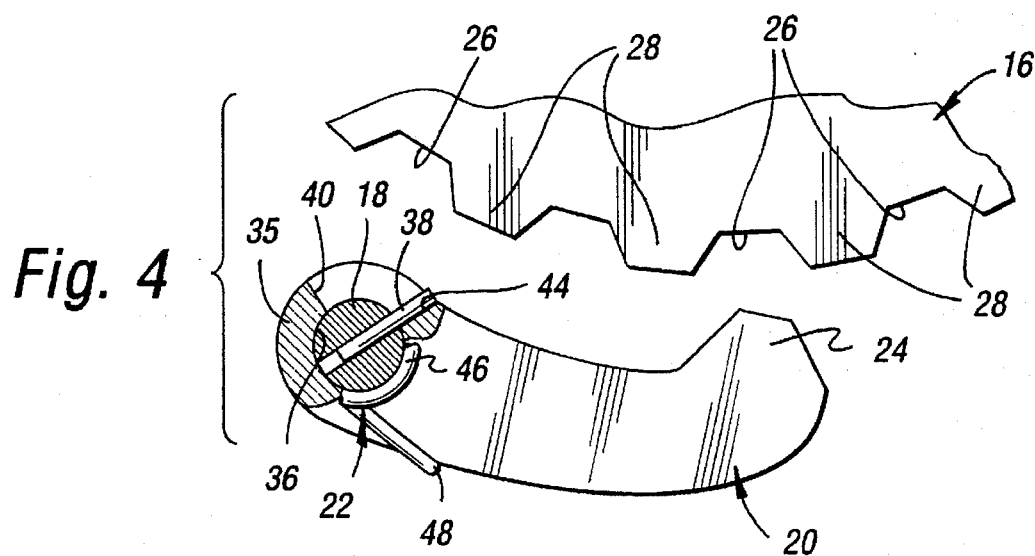
FIG. 4 is a view similar to FIG. 3 but showing the control rod having been rotated to non-Park position to simultaneously rotate the pawl to its non-Park position.

It will be understood that the pawl 20 may be released from the non-Park position in FIG. 4 by rotating the control rod 18 in the counterclockwise direction of rotation so that pin 38 rotates counterclockwise and the spring assembly 22 causes the pawl 20 to follow the control rod 18 in the counterclockwise direction to the Park position of FIG. 3.

Figure 5:
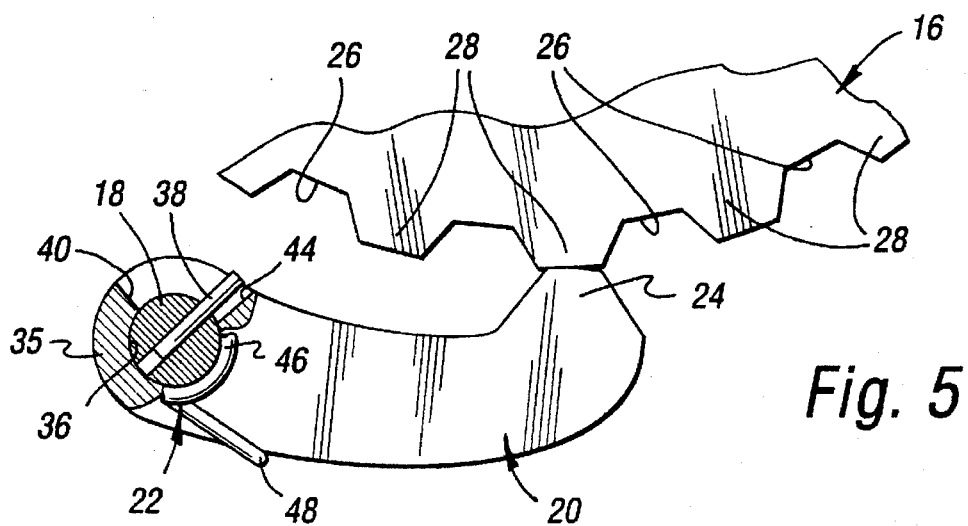
FIG. 5 is a view similar to FIGS. 3 and 4 but showing the control rod in the Park position but the pawl remaining in a disengaged position, as might occur during setting of the Park brake mechanism while the toothed output gear is still rotating.

In the event that the vehicle operator attempts to set the park mechanism to the Park position while the toothed output gear 16 is still rotating or misaligned with a toothed recess 26, control rod 18 will be rotated counterclockwise to its Park position of FIG. 5, while the pawl 20 skips over the teeth 16 of the toothed output gear 16 under the urging of the spring assembly 22. Once the toothed output gear 16 ceases rotation, the spring assembly 22 will return the pawl 20 to its Park position of FIG. 3.

Thus, it is seen that this invention provides a new and improved Park mechanism in which the pawl is biased toward the Park position by a spring, forcibly moved to a non-Park position by a control rod coupled with the pawl by a pin and slot lost-motion connection, and the pin and slot lost-motion condition permits the pawl to remain in a disengaged position irrespective of movement of the control to the Park position until a toothed recess of the toothed output gear aligns with the pawl tooth.

Although a pin and slot connection is shown in the Preferred Embodiment, other lost-motion type driving connections may be used. Furthermore, the invention is not limited to a torsion spring, and alternative known springs may be utilized.

I claim:

1. In a vehicle transmission having a housing and a toothed output gear secured for rotation with an output shaft rotatably supported on the housing, an improved Park mechanism for locking the output shaft against rotation; comprising:

a control rod supported in the housing for rotation to a Park and non-Park position;

a pawl member having a tooth portion and being rotatably supported on the control rod;

a spring drivingly connected to the control rod and resiliently engaging the pawl to urge the toothed portion into engagement with the toothed output member; and a drive member carried by one of the pawl member and control rod for selective engagement with the other pawl member and control rod upon rotation of the control rod from the Park to the non-Park position to enforce engagement of the pawl member from the toothed output member.

2. In a vehicle transmission having a housing and a a control rod supported in the housing for rotation to a Park and a non-Park position;

a pawl member having a toothed portion and being rotatably supported on the control rod;

a spring acting between the control rod and the pawl and resiliently engaging the pawl to urge the toothed portion into a Park position in engagement with the toothed output member and being resiliently yieldable to permit movement of the pawl to a non-Park position disengaged from the toothed output member;

a lost-motion driving connection between the pawl member and control rod adapted to permit movement of the pawl between Park and non-Park position independent of the position of the control rod and adapted to establish a driving connection between the control rod and the pawl when the control rod is moved to the non-Park position so that the pawl is rotated to the non-Park position.

3. In a vehicle transmission having a housing and a toothed output gear secured for rotation with an output shaft rotatably supported on the housing, an improved Park mechanism for locking the output shaft against rotation; comprising:

a control rod supported in the housing for rotation to a Park and a non-Park position;

a pawl member having a toothed portion and being rotatably supported on the control rod;

a torsion spring encircling the control rod and engaging the pawl to resiliently urge rotation of the pawl relative to the control rod into a Park position in engagement with the toothed output member; and a drive pin and slot driving connection between the pawl member and control rod adapted to establish a driving connection between the control rod and the pawl only when the control rod is moved out of the Park position so that the pawl is driven to the non-Park position by the control rod.

* * * * *